United States Patent [19]

Smith et al.

[11] Patent Number: 5,017,637

[45] Date of Patent: May 21, 1991

[54] LOW TOXICITY FIRE RETARDANT THERMOPLASTIC MATERIAL

[76] Inventors: Philip J. Smith, 211 Schooleys Mountain Rd., Long Valley, N.J. 07853; Jacques Mortimer, 145 Ramona Blvd., Markham, Ontario, Canada, L3P 2K9

[21] Appl. No.: 324,480

[22] Filed: Mar. 16, 1989

[30] Foreign Application Priority Data

Mar. 18, 1988 [GB] United Kingdom ............... 8806497

[51] Int. Cl.⁵ ............................................... C08K 5/07
[52] U.S. Cl. .................................... 524/354; 524/268; 524/269; 524/371; 524/405; 524/436; 524/437
[58] Field of Search ............... 524/354, 269, 436, 437, 524/268, 371, 405

[56] References Cited

U.S. PATENT DOCUMENTS

| | | | |
|---|---|---|---|
| 3,395,072 | 7/1968 | Talet et al. | 524/354 |
| 3,600,342 | 8/1971 | Nickerson et al. | 524/354 |
| 4,387,176 | 6/1983 | Frye | 524/268 |
| 4,430,468 | 2/1984 | Schumacher | 524/437 |
| 4,430,470 | 2/1984 | Taniguchi et al. | 524/269 |
| 4,533,687 | 8/1985 | Itoh et al. | 524/269 |
| 4,560,719 | 12/1985 | Nakamura et al. | 524/269 |
| 4,671,896 | 6/1987 | Hasegawa et al. | 524/269 |
| 4,722,959 | 2/1988 | Inoue et al. | 524/436 |
| 4,731,406 | 3/1988 | Itoh et al. | 524/437 |
| 4,732,939 | 3/1988 | Hoshi et al. | 524/436 |
| 4,751,262 | 6/1988 | McKinney et al. | 524/437 |
| 4,801,639 | 1/1989 | Hoshi et al. | 524/436 |

*Primary Examiner*—Veronica P. Hoke
*Attorney, Agent, or Firm*—Bell, Seltzer, Park & Gibson

[57] ABSTRACT

A fire-retardant thermoplastic compound that can be used as compound or further enhanced through chemical cross linkage. The compounding thereof and the composition are disclosed. The compound is manufactured from a composition of a copolymer or terpolymer with a carboxylic acid comonomer and optionally a low modulus polymer and a synthetic hydrocarbon elastomer with or without a graft of ethylenically unsaturated carboxylic acid or anhydride. A fire retardant additive comprising a group I, group II or group III metal oxide hydrate with the proviso that at least 1% by weight of the composition is in the form of an organopolysiloxane. The compound may be used for sheet or wire extrusion and for injection or compression molding.

9 Claims, 2 Drawing Sheets

LOW TOXICITY FIRE RETARDANT THERMOPLASTIC MATERIAL

FIELD OF THE INVENTION

This invention relates to very low toxicity, fire retardant thermoplastic compositions which may be processable into various products in which fire safety is a consideration.

BACKGROUND OF THE INVENTION

Although flame retardant polymer compositions have been in use for several decades, they have generally relied upon the presence of halogens, mainly chlorine or bromine containing chemicals, to yield flame retardancy. Examples include polychloroprene ("neoprene"), chlorosulphonated polyethylene ("Hypalon"), thermoplastic PVC compounds, or compounds of polyethylene with halogenated flame retardant additives.

Materials under development over the last ten years, and even more intensively in the last five years in Europe and the United States have focused on halogen free, flame retardant (HFFR) compounds, since halogens give off very toxic and corrosive combustion products in fires.

Thermoset HFFR's have been developed based on polyethylene and its copolymers, but these materials have inherently high processing costs due to the need for crosslinking. Thermoplastic HFFR's, usually classified as thermoplastic polyolefins or TPO's since they are typically based on polymers and copolymers of ethylene and propylene, are the focus of much industrial materials research at present for construction and transportation because of their greater ease of use (fabrication into end use products) and the recyclability of trim or scrap.

Development of a cost effective and acceptable performance HFFR/TPO is a challenging project. The essence of the technical challenge is as follows: Conventional materials, namely PVC compounds, have shown a good balance of properties in mechanical strength and flexibility, chemical, aging resistance and low cost. Unfortunately, burning PVC's release a great deal of black smoke and their combustion fumes contain HCl gas, which is highly corrosive, particularly in combination with the water used to fight fires. This hydrochloric acid is capable of destroying expensive computer equipment and even such rugged electrical fixtures as fuse boxes which may not be directly destroyed by the flame or heat of a fire.

Halogen free systems of modest cost are restricted to polyolefins in terms of raw material. Polyolefins do not have inherently good flame resistance. Choice of halogen free flame retardant additives is limited to certain hydrated halogen free flame retardant additive minerals such as alumina trihydrate (ATH) or magnesium hydroxide, which are relatively inexpensive.

These flame retardant additives function by releasing their water of hydration, preferably at temperatures above those required for processing but below those of combustion of the flame retardant composition. At relatively high concentrations, such additives also impair combustion by conducting heat relatively efficiently from burning surfaces. To maximize these flame-retardant effects, it is preferable that the flame retardant additives be present at maximum levels.

However, these particular halogen free flame retardant materials are relatively inefficient and must be added in large amounts (>50% by weight). Because such flame retardant materials are non reinforcing in the final product, HFFR/TPO compounds using this conventional technology normally have poor strength and flexibility, poor processing characteristics (eg. ease of mixing and extrusion) and only fair flame retardancy.

Approaches tried to avoid these difficulties include the use of coupling agents (to compensate for the non-reinforcing nature of ATH), and intumescent additives (also called char formers).

Silicone flame retardants for plastic compositions have been extensively investigated in U.S. Pat. No. 4,387,176. A composition which lends fire-retardancy to a thermoplastics includes a silicone with a group IIA metal organic salt and a silicone resin which is soluble in the silicone to impart flame-retardancy to the thermoplastic. The silicone is of the general organopolysiloxane group, such as polydimethylsiloxane. The silicone resin is generally represented by the formula MQ where M is the monofunctional group of the average formula $R_3SiO_{0.5}$ and the tetrafunctional Q units of the average formula $SiO_2$ with the average ratio of approximately 0.3:4 of M units per Q unit. The patent teaches that this fire-retardant composition is useful with a variety of thermoplastics including specifically polypropylene, polyethylene, polycarbonate, polystyrene, acrylonitryl-butadiene-styrene terpolymer, polyphenylene oxide-polystyrene blends, acrylic polymer, polyurethane and polyamides. It is required that the group IIA metal organic salts be included to ensure solubility of the silicone resin in the polysiloxane base. Representative salts include magnesium stearate, calcium stearate, barium stearate, strontium stearate. It has been found, however, that compositions of this type are not readily processable particularly when high loadings of fire-retardant additives are included.

SUMMARY OF THE INVENTION

According to an aspect of the invention, a fire-retardant composition comprises:

(a) 5% to 60% by weight of an olefinic copolymer or terpolymer wherein 3% to 20% by weight of the copolymer or terpolymer is a carboxylic acid comonomer;

(b) 1% to 15% by weight of an organopolysiloxane; and (c) 20% to 85% by weight of a flame-retardant additive comprising a group I or group II or group III metal oxide hydrate.

According to another aspect of the invention, the processability of the above composition is greatly improved by including a dialdehyde in the composition.

According to another aspect of the invention, the formability of the composition is greatly improved by the inclusion of polymers, such as low modulus ethylene copolymers, polyethylene, polypropylene, ethylenepropylene synthetic rubbers and ethylenepropylene elastomers with a reactive monomer graft.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
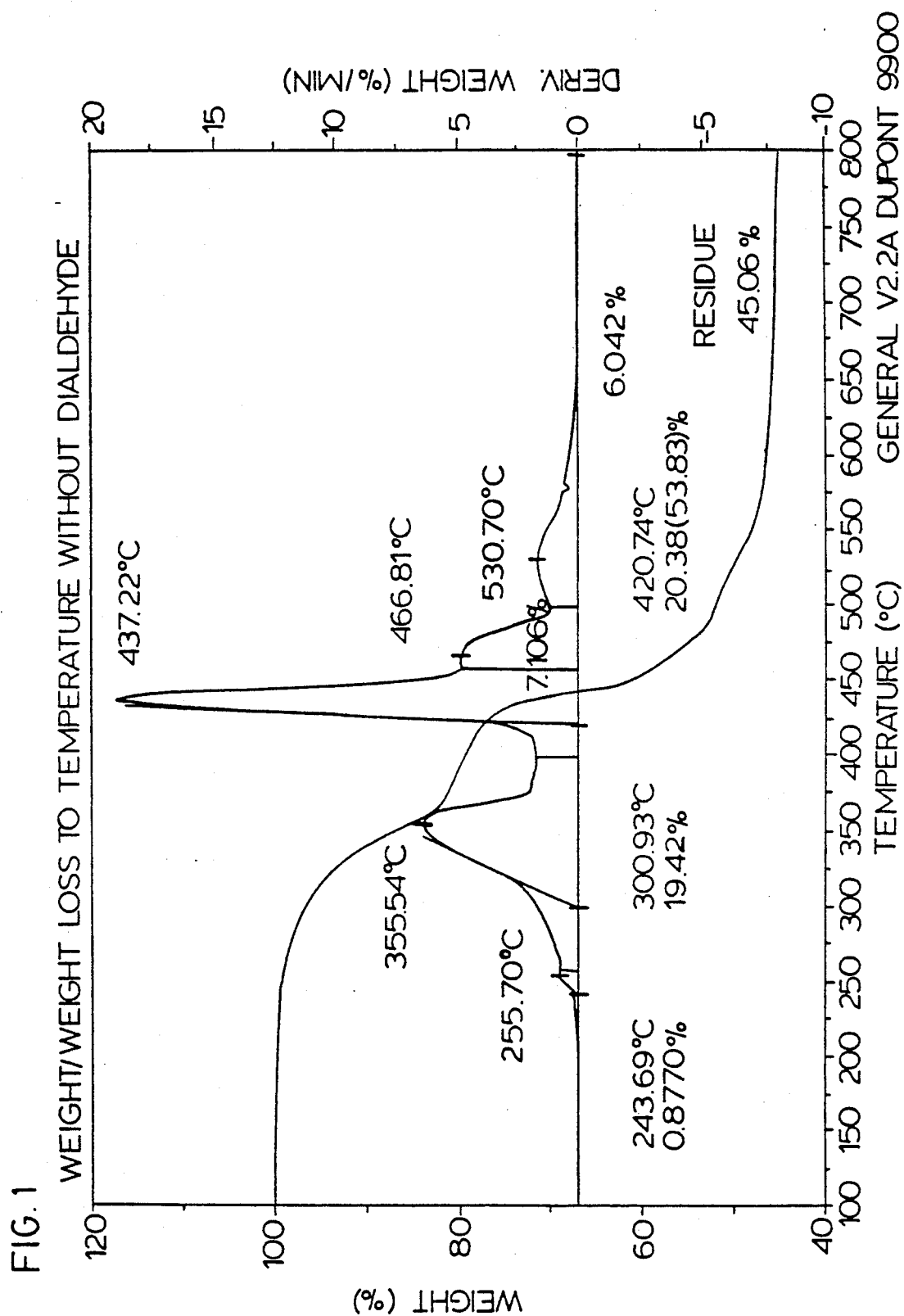
FIGS. 1 and 2 show weight and percent weight loss of two compositions during heating.

Compositions of this invention provide a series of very low toxicity, fire-retardant compounds that comply with the requirements of a Class A composition when tested in accordance with the procedures of ASTM E-84. The preferred compositions include a copolymer or terpolymer wherein 3% to 20% by weight of the copolymer or terpolymer is a carboxylic acid comonomer. These compounds are intended for use in the construction, building and wire insulation industries.

Fire-retardant plastics are commonly available. However to achieve their ratings, it has been essential to use halogenated polymers or additives as flame retardant agents. As already noted, those materials are becoming unacceptable in respect to the toxicity and corrosivity of the decomposition products when subjected to heat and/or fire.

The flame retardant compositions of this invention release combustion products of low optical density and low levels of toxicity. These materials can be manufactured without using harmful halogenated additives.

The flame retardant properties of these compositions are advantageous in the construction, building and wire insulation industries in meeting the requirements of burn tests in accordance with ASTM E-84 in addition to UL 94 V-O and UL wire and cable vertical flame tests.

These compositions perform particularly well in characteristics of Flame Spread Index [FSI] and Smoke Density [SD]. These characteristics are now commonly specified in government regulations and included in specifications of other agencies i.e. Underwriters Laboratories, and State, Provincial and Municipal Building codes.

The fire-retardant composition of this invention comprises:

(a) 5% to 60% by weight of an olefinic copolymer or terpolymer wherein 3% to 20% by weight of the copolymer or terpolymer is a carboxylic acid comonomer.

According to a preferred embodiment of the invention, the copolymer or terpolymer is selected from the group consisting of a copolymer of ethylene and ethylene acrylic acid and a copolymer of ethylene and methacrylic acid. In each of these copolymers, there is 3% to 20% by weight of the copolymer of carboxylic acid comonomer. Although the reactivity of the copolymer, terpolymer with a carboxylic acid comonomer with other components of the composition is not fully understood, it is theorized that the carboxylic acid comonomer is reactive with the other components of the composition to improve processability, formability and fire retardancy.

In addition to the copolymer, terpolymer, another component of the composition is 1% to 15% by weight of an organopolysiloxane. The organopolysiloxane is a compound selected from the group represented by the formulae:

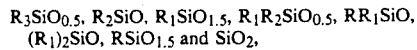

wherein each R represents independently a saturated or unsaturated monovalent hydrocarbon radical, $R_1$ represents a radical such as R or a radical selected from the group consisting of a hydrogen atom, hydroxyl, alkoxyl, aryl, vinyl, or allyl radicals; and wherein said organopolysiloxane has a viscosity of approximately 600 to 300,000,000 centipoise at 25° C.

Organopolysiloxane acts as a plasticizer (or internal lubricant), a low level linking agent and a coupling agent between the hydrophobic polymer and the hydrophilic flame retardant additive material. As a result of this unexpected effect of the organopolysiloxane, it is now possible to incorporate larger amounts of the flame retardant additive than in previous flame retardant compositions. Surprisingly, compositions, in which an organopolysiloxane is thus utilized, retain plasticity and processability even at relatively low temperatures.

The fire retardancy of some of the compositions of this invention may be improved by including active silicone resin in the organopolysiloxane. The reactive resin is represented by the formula:

wherein said reactive silicone resin is comprised of monofunctional M units of the average formula $R_3SiO_{0.5}$ and tetrafunctional Q units of the average formula $SiO_2$, and having an average ratio of approximately 0.3 to 4.0 M units per Q unit.

To enhance the solubility of the reactive silicone resin in the organopolysiloxane, it is usually necessary to include a group II metal organic salt with the composition. Appropriate amounts of the group II metal organic salt are added as required to solubilize the reactive silicone resin in the polysiloxane base.

It is believed that the reactivity of the polysiloxane with the carboxyl moieties of the copolymer, terpolymer aids in the incorporation of the hydrophilic flame-retardant additives in the polymer composition. Hence it is now possible to incorporate larger amounts of the flame-retardant additives than in previous flame-retardant compositions while retaining processability and subsequent formability into desired commercial products.

One organopolysiloxane useful in the compositions of this invention is Dow Corning 200 Fluid. It is a dimethylsiloxane polymer. This silicone polymer is essentially non-reactive except for a small amount of silanol (approximately 200 to 800 parts per million) left over after processing. Dow Corning 200 Fluid can be made reactive, if desired, through the addition of a secondary hydroxyl functional silicone resin, such as Dow Corning 1248 Fluid.

Another useful organopolysiloxane is General Electric's SFR 100, which is essentially a silicone fluid similar to the Dow Corning 200 Fluid with the difference that is has been modified through the addition of group II metal organic compound(s) and a reactive silicone resin (specifically polytrimethylsilylsilicate) represented by the formula MQ, where said reactive silicone resin is comprised of monofunctional M units of the average formula $R_3SiO_{0.5}$ and tetrafunctional Q units of the average formula $SiO_2$ and having an average ratio of approximately 0.3 to 4.0 M units per Q unit having a ratio of approximately 0.3 to 4.0 M units per Q unit.

The fire-retardant additives, according to this invention, are generally defined by group I and group II metal oxide hydrates. There are a variety of such hydrates available, although the preferred hydrates are selected from the group consisting of alumina trihydrate, magnesium hydroxide and hydrotalcite (sodium aluminum hydroxy carbonate). Another hydrate, which is useful in some compositions, is hydracarb, which is a form of hydrated calcium carbonate. The organopolysiloxane may have a viscosity in the range of 0.6 centipoise to $300 \times 10^6$ centipoise, although in most situations the preferred viscosity range is $10 \times 10^3$ centipoise to $900 \times 10^3$. For the compositions which are used in a variety of commercial products, such as coverings for wire cable, the viscosity is normally in the range of $30 \times 10^3$ centipoise to $600 \times 10^3$ centipoise. The preferred organopolysiloxane is polydimethylsiloxane.

In addition to the fire-retardant additive, other suitable fillers may be included, such as talc, calcium carbonate, mica, clay, zinc borate, wallastonite and mixtures thereof.

It has been found that the addition of dialdehydes surprisingly improves the processability and workability of the compositions. Preferred dialdehydes are selected from the group consisting of glyoxal and glutaraldehyde.

The dialdehydes are used in the range of 0.1% to 4% by weight of the composition, although the preferred range is from 0.5% to 3% by weight of the selected dialdehyde in the composition.

Although the function of the dialdehyde in the composition is not fully understood, it is believed that the additional carboxyl groups of the dialdehyde react to combine with the organopolysiloxane and the carboxyl groups of the co- and terpolymers. A dialdehyde (such as glyoxal) is believed to cross-link the polymeric units by polycondensation reactive processing. In the field of fire retardant thermoplastics, free radical polymerization had heretofore been the method or choice. The use of polycondensation is a novel approach which gives unexpectedly good fire retardancy and processability. This approach causes cross-linking which increases with the amount of dialdehyde used.

To further enhance this reactivity, it has also been found that the addition of monomer grafts, such as maleic anhydride, further enhance the composition. Furthermore, maleic anhydride may be used with other additives to be described. Processability can also be improved by the addition of group II metallic stearates.

Formability of the composition, particularly in sheet form, becomes important in forming a variety of building products, such as ceiling tiles and the like. To enhance the formability, the inclusion of up to 30% by weight of a polymer selected from the group consisting of low modulus ethylene copolymers, polyethylene, polypropylene, ethylenepropylene synthetic rubbers and ethylenepropylene elastomers with a reactive monomer graft are particularly useful. The low modulus ethylene copolymers may be selected from the group consisting of ethylenevinylacetate, ethylenemethylacrylate, ethyleneethylacrylate and ethylenebutylacrylate. As previously noted, the properties of the ethylenepropylene elastomer may be improved with a monomer graph, particularly maleic hydride.

Although the composition of this invention is intended to be halogen-free, in certain situations where use of halogens is not of particular concern, the fire retardancy of the composition can be enhanced by the addition of organic halides, such as decabromodiphenyloxide. Normally when halogens are incorporated into a composition, an antimony oxide synergist is included with the composition up to approximately 10% by weight to improve flame retardancy by combining the halogens, thus preventing their loss to the atmosphere during combustion.

According to a preferred embodiment of the invention, a representative composition providing for fire retardancy and processability and formability is the following:

(a) 5% to 60% by weight of (i) a copolymer of ethylene and acrylic acid containing from 3% to 9.0% of the acrylic acid comonomer and (ii) with 2% to 10% by weight of the mixture comprised of the organopolysiloxane coupling agent with or without 25% to 60% by weight of a metallic stearate;

(b) 5% to 20% by weight of the composition of at least one polymeric material selected from ethylene copolymers, polyethylene and/or from a group of synthetic hydrocarbon elastomers;

(c) 50% to 85% by weight of the composition of a filler comprising 40% to 100% by weight of at least one of aluminum trihydrate and magnesium hydroxide and 0% to 60% by weight of at least one of hydracarb, zinc borate, mica and clay.

These compositions may be extruded into sheet material having a Flame Spread Index [FSI] of less than 50 and a Smoke Density [SD] of less than 50.

Preferably the compositions of the present invention also contain 5% to 20% of a polymeric material selected from combinations of synthetic hydrocarbons elastomers and low modulus polymers and mixtures thereof. In embodiments of the composition the elastomer is defined as a substance that is capable of being extended to twice its length at 68° C. and on release of the applied stress returns with force to approximately its original length. Compatibility with polyethylene is a desirable feature in order to improve product toughness. The use of high ethylene elastomers is essential to provide the melt flow properties required.

As already noted, the preferred elastomers are ethylenepropylene copolymer or an ethylenepropylenediene terpolymer or a terpolymer e.g. ethylenepropylenediene.

In combination the polymeric material may be a low modulus polymer. This category includes such polymers as polyethylene, ethylenevinylacetate, ethyleneethylacrylate, and ethylenemethylacrylate copolymers.

The carboxylic acid copolymer, such as EAA, plus other polymeric materials comprises 15% to 30% by weight of the composition. However for most methods of fabrication, the carboxylic acid copolymer, such as EAA, plus other polymeric material should be at least 25% of the composition.

The composition of the present invention also contains 50% to 85%, especially 55% to 75% and more particularly 55% to 65% by weight of the composition of fire-retardant additive. Of this filler 40 to 100 parts by weight is alumina trihydrate [ATH] viz, $Al_2O_3 3H_2O$, and/or magnesium hydroxide and/or sodium aluminum hydroxy carbonate and hydrotalcite. According to an aspect of the invention all of the filler may be ATH or magnesium hydroxide. The remainder of the filler, i.e. up to 60% parts by weight is hydracarb, zinc borate, mica and/or clay incorporating color pigments, lubricants and stabilizers not to exceed 10 parts of the 0 to 60 parts designated.

In order to facilitate processing of the compositions of this invention, it is preferred that the flame-retardant, additive material has a relatively broad particle size distribution. This requires selection of a mechanically ground flame-retardant, additive material or a precipitated product. According to one embodiment of the invention, the flame-retardant, additive material will have a coarse and fine fraction with a distribution of about 0.5 to 60.0 μm and a median of about 2.5 μm. The flame-retardant, additive material should have a coarse fraction of about 60% by weight. High proportions of fine particles may cause processing difficulties at high flame-retardant, additive material levels but may improve flame resistancy due to greater surface area.

The compositions of this invention must all be compounded prior to fabrication. The equipment recommended must be of the high intensity design. The mixer must also incorporate adequate auxiliary equipment including scales and finishing equipment with proper drying facilities. The compounder [mixer] should be computer controlled for optimum mixing cycle. Recommended mixers are: Banbury, Moriyama, FCM [Farrel Continuous Mixer], Pomini Continuous Mixer and other high intensity mixers, i.e. Berstorff, Werner Fleiderer etc.

The compounding equipment should be operated at temperatures below the decomposition temperature of the filler, it being understood that if the material contains more than one flame-retardant, additive material, the temperature is lower than the lowest decomposition temperature of such flame-retardant, additive material.

It is anticipated that the compositions will contain at least one antioxidant and at least one ultraviolet (UV) absorber. It will be appreciated by those skilled in the art that the amount and type of additive may effect changes in and the rate of change of properties over a period of time i.e. especially physical properties of products derived therefrom. One property of particular importance is the color of the composition. Apart from matters like cigarette smoke and pollution the aesthetic qualities of the product must remain as installed.

In another embodiment of the present invention all components are equivalent except for the elastomer indicated. An elastomer may be substituted consisting of an ethylene propylene elastomer to which reactive monomer such as maleic anhydride has been grafted. As is appreciated, the polyolefin back-bone, provides outstanding environmental resistance, aging properties, thermostability, chemical resistance as well as ease of processing. The reactive group on the polyolefin backbone results in improved adhesion properties to various substrate materials. It can be utilized directly as one of the polymeric materials as all or part of 5-20% by weight of the composition.

In another embodiment the addition of a metallic stearate to the organopolysiloxane is desirable. This will amount to 40% of the organopolysiloxane utilized. In a fire, it is thought that the silicone mixture functions synergistically with the stearate to produce a hard, slightly intumescent char that insulates the remaining substrate from heat and prevents flame spread by eliminating dripping. Its effectiveness is pronounced in the most severe flame tests.

The inclusion in composition of a free radical acceptor (acrylic monomer or dimer) or a chemical cross linking agent (peroxide) enabling irradiatable cross linkage or chemical cross linkage respectively will enhance the properties of all the compositions defined in this invention. Physical properties i.e. tensile strength, tensile modulus, impact resistance, flexibility and material flame resistance will show definite improvement.

With glyoxal (the preferred dialdehyde), use of 0.1% to 4% by weight of the total product provides the preferred results. Concentrations of up to 10% by weight may be used where processability of the other components is a problem. Too high a concentration of dialdehyde, however, yields a thermoset rather than a thermoplastic. Thermosets have very reduced flow characteristics (compared to thermoplastics) and are extremely difficult to process, so they normally would not be acceptable for formation into sheet, tiles, wire coverings and the like.

The use of glyoxal and an organopolysiloxane enables concentrations of flame retardant additives as high as 85% by weight to be practically processable using conventional extrusion and molding techniques.

Other members of the homologous series of dialdehydes will also aid processability such as glutaraldehyde.

Maleic anhydride is useful with ethylene propylene synthetic rubbers in this composition. Maleic anhydride increases the flame retardancy as it produces a more viscous intumescent foam or char during combustion. This more viscous foam does not drip from the burning material and serves to shield material that would otherwise be exposed to combustion during burning.

Maleic anhydride is believed to aid in the formation a viscous intumescent foam during combustion by crosslinking the polymeric units as a result of its carboxylic functionality. This is believed to be a process analogous to the cross-linking that takes place with olefinic copolymers or terpolymers used in this invention, wherein 3% to 20% by weight of said copolymers or terpolymers are carboxylic acid comonomers.

Processing of the compositions of this invention can occur at relatively low temperatures. The halogen free flame retardant materials such as alumina trihydrate lose their water of hydration at 420° F. The presence of this water of hydration is essential for effective fire retardancy. Formerly, processing had to take place at 350° to 410° F., because old flame-retardant materials were so difficult to work with. This involved the risk of ruining the flame retardant materials' efficacy.

With glyoxal and an organopolysiloxane, much lower processing temperatures of 250° to 310° F. are possible, and with much higher flame retardant material concentrations. Also, the material is more fluid at the same concentration of flame retardant material than previous preparations. As a result, industrial production can run faster, with more production per person hour. The lower processing temperatures make for faster cooling and therefore slightly lower processing costs.

Several major developments are in progress in the area of understanding of fire dynamics and the scientific study of performance of materials in a fire. Work on fire dynamics centers around the building of mathematical, computer driven models of "compartment fires" (models of single room fires) and the extension of these fire models to multistory buildings. The objective is to be able to determine how the choice of materials and design of a building affect the fire death toll for a hypothetical fire in a real building.

From a materials viewpoint, the main impact of the fire science work is characterized by the following parameters:

Ignitability;
flame spread rate;
heat release rate;
smoke toxicity (mainly inhalation toxicity to humans);
smoke density (obscuration of visibility); and
smoke corrosivity (corrosive effects on electronic equipment).

Conventional PVC compounds are inherently good in the first three items but perform poorly in smoke density. Their smoke toxicity is the subject of debate, it may not be worse than that of other conventional plastics in this regard. On the issue of corrosivity, AT&T has publicly presented data on the serious building-wide damage to telephone switching equipment experienced with burning PVC insulated wire.

The compositions, according to this invention, preform extremely well in the ignitability, flame spread rate, heat release rate, smoke toxicity, smoke corrosivity, and smoke density parameters.

In addition, success at maintaining good manufacturing processability for the compositions of this invention is maintained, which has been impossible with prior approaches. Surprisingly, the compositions of this invention are easily processed into end use products such as wire and cable extrusions, and sheet extrusions for a variety of construction products.

Further, addition of small amounts of zirconates, titanates, zinc, and tin salts enhances physical properties of the final product. Metallic stearates improve processability. These materials in combination with dialdehydes raise the viscosity of the burning material and thus improve flame retardancy by contributing to the intumescent char that forms at burning surfaces rather than dripping off and leaving more new material exposed for combustion.

In all the compositions of this invention, reactive processing builds in a sufficient degree of cross-linking among polymeric units, and between polymeric units and particles of flame-retardant additives is such that the composition is easily processable (extrudable and moldable) at relatively low temperatures and relatively high flame retardant additive levels.

Performance and flame retardancy of these compositions could be enhanced by any of the conventionally known halogen-containing fire retardant additives such as decabromodiphenyloxide. Addition of an antimony oxide synergist to the halides in appropriate amounts to combine with and prevent them from being lost to the atmosphere considerably improves the flame retardancy of compositions containing the halides.

The fire retardant composition, according to this invention, therefore has among others the following five distinct features:

(1) processability over a broad range of component concentrations in the composition;

(2) processability at considerably lower processing temperatures compared to prior art compositions;

(3) significant increase in the formability properties of the composition when extruded in sheet form due primarily to the presence of the low modulus copolymers and/or elastomers;

(4) enhanced fire retardancy properties primarily due to the incorporation of very high amounts of fire-retardant additives facilitated primarily by the use of the polysiloxanes which react with the carboxylic acid comonomers of the co- and terpolymers, and optionally the inclusion of a dialdehyde; and (5) enhanced slump stress characteristics which ease lamination.

Preferred embodiments of the invention are demonstrated in the following Examples which are understood to be enabling with respect to preferred embodiments of the invention, but are not to be interpreted as restrictive to the scope of the appended set of claims.

EXAMPLE I

A number of samples of compositions of the invention were prepared in a laboratory Type BR Banbury mixer and compression molded into test specimens 25 to 35 mils thick. Their flame retardant properties were then compared with a commercially available competitive material as the standard. A simulated ASTM E-84 test was used together with a much more severe vertical flame test.

The T.V.I. Vertical Flame Test is defined as follows:
Specimen:
 1"×8" extruded or pressed
 25 to 35 mils thick
Flame Application: 30 seconds
After burn: seconds
Criteria:
 Pass—self extinguishing
 Fail—destructive burn or heavy drip

TABLE 1

| Sample No. | Dupont Std | 1 % | 2 % | 3 % | 4 % | 5 % | 6 % | 7 % | 8 % | 9 % | 10 % | 11 % |
|---|---|---|---|---|---|---|---|---|---|---|---|---|
| RESIN: | | | | | | | | | | | | |
| LLDPE | 26.0 | — | — | — | — | — | — | — | — | — | — | — |
| EAA 3330 | — | 18.0 | 22.0 | 22.0 | 22.0 | 22.0 | 22.0 | 23.5 | 15.0 | 24.5 | 15.0 | 15.0 |
| EAA | — | — | — | — | — | — | 5.0 | — | — | — | — | — |
| EVA 1830 | — | 9.0 | 5.0 | 5.0 | 5.0 | 5.0 | — | 5.0 | 5.0 | 5.0 | 12.5 | 15.0 |
| Elastomer | 10.0 | 4.5 | 4.5 | — | 4.5 | 4.5 | 4.5 | — | 5.0 | 7.5 | — | — |
| Grafted Elastomer | — | — | — | 4.5 | — | — | — | 7.5 | — | — | 12.5 | 10.0 |
| Silicon Coupler | — | 5.0 | 5.0 | 5.0 | 5.0 | 5.0 | 5.0 | 5.0 | 6.0 | 5.0 | 6.0 | 6.0 |
| Glyoxol | — | — | — | — | — | — | — | — | 1.0 | 1.0 | 0.75 | 0.75 |
| ADDITIVES: (Fillers, pigments, stabilizers) | | | | | | | | | | | | |
| ATH | 61.0 | 61.5 | 61.5 | 61.5 | 50.0 | 50.0 | 61.5 | 51.0 | 61.0 | 50.0 | 45.0 | 45.0 |
| TiO$_2$ | 3.0** | 2.0 | 2.0 | 2.0 | 2.0 | 2.0 | 2.0 | 3.0 | 2.0 | 2.0 | 2.0 | 2.0 |
| Mica | — | — | — | — | 11.5 | — | — | — | — | — | — | — |
| Hydracarb | — | — | — | — | — | 11.5 | — | — | — | — | — | — |
| Zinc Borate | — | — | — | — | — | — | — | 5.0 | 5.0 | 5.0 | 6.0 | 6.0 |
| U.V. Stabilizer | — | — | — | — | — | — | — | — | — | — | 0.25 | 0.25 |

*Includes EVA & Dupont graft system.
**Includes stabilizer & lubricant package.
Note: the EAA's are Dow Chemical's Primacor 3330 and 3460 resins.

The low modulus polymer is CIL's 1830, an 18% vinyl acid copolymer.

The elastomer of all runs except sample 3 is Epsyn DE 208 supplied by Copolymer Corp.

The elastomer in sample 3 is Exxon's Exxolor VA 1801 consisting of an ethylene propylene elastomer to which a reactive monomer, such as maleic anhydride, has been grafted.

The silicon coupler is General Electric's SFR-100. This material has proven effective on test with or without the addition of a metallic stearate.

Flame Evaluation:

All samples pass ASTM E-84 with an FSI less than 25 and a SD less than 50.

|  | Dupont Std | Mortile Vertical Test | | | | | | |
|---|---|---|---|---|---|---|---|---|
|  |  | 1 % | 2 % | 3 % | 4 % | 5 % | 6 % | 7 % |
| AFTERBURN | | | | | | | | |
| Secs. | 200 | 120 | 1.5 | — | 153 | 220 | 2.5 | — |
| Criteria | Fail Sample Destroyed | Pass | Pass No Ignition | Pass | Pass | Pass | Pass | Pass No Ignition |

All samples exhibit good flame resistance when tested in accordance with ASTM E-84. The samples produced in accordance with this invention exhibit superior flame resistance. The use of low modulus polymers and elastomers provides improved tensile and flexural strength making the finished product suitable for vacuum forming.

EXAMPLE II

| SAMPLE NO. | STD. | 1 % | 2 % | 3 % | 4 % | 5 % |
|---|---|---|---|---|---|---|
| LLDPE | 26.0 | — | — | — | — | — |
| Carboxylic acid Copolymer | — | 22.0 | 22.0 | 22.0 | 22.0 | 23.5 |
| Low modulus Polymer | — | 5.0 | 5.0 | 5.0 | 5.0 | 5.0 |
| Elastomer | 100.0 | 4.5 | — | 4.5 | 4.5 | — |
| Grafted elastomer | — | — | 4.5 | — | — | 7.5 |
| Polydimethyl Siloxane Filler | — | 5.0 | 5.0 | 5.0 | 5.0 | 5.0 |
| ATH | 61.0 | 61.5 | 61.5 | 50.0 | 50.0 | 51.0 |
| Zinc borate | — | — | — | — | — | 5.0 |
| Mica | — | — | — | 11.5 | — | — |
| Hydracarb | — | — | — | — | 11.5 | — |
| Additives* | 3.0 | 2.0 | 2.0 | 2.0 | 2.0 | 3.0 |

*Colors, antioxidants, lubricants, etc.

The elastomer used in Sample 3 and 4 is ethylenepropylene, terpolymer. The grafted elastomer is an ethylenepropylene terpolymer with a maleic anhydride graft.

The acrylic acid ethylene copolymers used are marketed under the trade name Primacor by Dow Chemical.

The reactive polydimethyl siloxane copolymer is SFR-100 supplied by the General Electric Co.

| SAMPLE NO. | STD. | 1 | 2 | 3 | 4 | 5 |
|---|---|---|---|---|---|---|
| Afterburn (secs) | 200 | 145 | — | 153 | 220 | — |
| Test criteria | Fail Sample Destroyed | Pass No Ignition | Pass | Pass | Pass | Pass No Ignition |

All samples in this invention exhibit superior flame retardancy. The use of low modulus polymers and elastomers provide improved tensile and flexular strength making the finished products suitable for vacuum forming.

EXAMPLE III

Laboratory compounds were mixed in a Type Br Banbury and compression molded into test specimens 25 to 35 mils thick. Their flame retardant properties were then compared using a simulated vertical flame test against a commercially available UL approved ceiling tile material that meets ASTM E-84.

Test Description:

Specimen—1×8×0.025 to 0.035 inches
Flame application—30 seconds
Criteria—pass—self extinguishing
Fail—destructive burn and heavy drip.

TABLE 1

| Sample | STD % | 1 % | 2 % | 3 % |
|---|---|---|---|---|
| RESIN | | | | |
| Polyethylene (grafted) | 26.0 | — | — | — |
| Acrylic acid copolymer | — | 15.0 | 15.0 | 15.0 |
| Low modulus polymer | — | 8.0 | 5.0 | 5.0 |
| Elastomer | 10.0 | 7.0 | 5.0 | 5.0 |
| Polydimethylsiloxane | — | 5.0 | 5.0 | 5.0 |
| FILLER | | | | |
| ATH | 61.0 | 53.0 | 58.0 | 50.0 |
| Zinc borate | — | 8.0 | 8.0 | 8.0 |
| Calcium carbonate | — | — | — | 8.0 |
| Additives* | 3.0 | 4.0 | 4.0 | 4.0 |
| Flame test results | FAIL Destructive Burn & drip | PASS self extinguish no drip | PASS | PASS |

*Color, antioxidants, lubricants, etc.

The elastomer used in formulation 1 to 3 is an ethylene, propylene terpolymer to which a reactive monomer, such as maleic anhydride has been grafted. This elastomer was supplied by Exxon Chemical Company.

The low modulus polymer was an ethylenevinyl acetate copolymer obtained from Exxon Chemical Company.

The acrylic acid ethylene copolymers are obtained from Dow Chemical USA and are marketed under the trade name PRIMACOR.

The reactive polydimethylsiloxane copolymer is supplied by General Electric Company under the trade name SFR-100.

EXAMPLE IV

Biological, Physical and Chemical Data of Sample 8 of Example I.

| AL Test #197, Sample #A-0028 | Case #010489-1 |
|---|---|
| $LC_{50}{}^a$ | 87.3 grams |
| 95% Confidence interval$^a$ | 74.6–102.3 grams |
| $LC_{50}$ sample dimensions/description$^b$ | chips |

-continued

| AL Test #197, Sample #A-0028 | Case #010489-1 |
|---|---|
| Furnace temperature at 1% weight loss[b] | 299° C. |
| Furnace temperature range at most rapid weight loss[b] | 420°-600° C. |
| Furnace temperature at apparent spontaneous flame (mean of 7 samples) | 454° C. |
| Percent residue (mean of 6 samples) | 50.6% |
| Maximal CO in exposure chamber[b] | 0.08% 800 ppm |
| Furnace temperature at maximal CO[b] | 570° C. |
| Maximal $CO_2$ in exposure chamber[b] | 2.11% |
| Furnace temperature at maximal $CO_2$[b] | 570° C. |
| Minimal $O_2$ in exposure chamber[b] | 19.8% |
| Furnace temperature at minimal $O_2$[b] | 570° C. |
| Number of times exposure chamber exceeded 45° C.[b] | None |
| Duration exposure chamber exceeded 45° C.[b] | 0 sec |
| Eye damage (corneal opacity)[c] | None |
| Eye damage (severity) | None (1) |
| Number of test runs on sample material | 7 |

[a]calculated according to the method of C. Weil, 1952.
[b]from single experiment using 87.3 gram test sample.
[c]from single experiment with animals using 78.1 gram test sample; sample weight equal or closest to the $LC_{50}$ value.

The results of this test demonstrate characteristics which are approximately ten times better than polyethylene pellets and better than most other known olefins from the standpoint of biological, physical and chemical data in the fire retardancy field.

EXAMPLE V

Vertical Burning Test—UL 94 (specimens were tested "as is", i.e. no conditioning).

Sample 9 of Example I (#0202-6, 125 to 130 mil)

Three specimens 5 inches × ½ inch were cut from a sample. They were tested using the Vertical Burning Test for 94-54 classification.

The burner was adjusted to produce a five inch flame with a one and a half inch inner blue cone (using natural gas). The test flame was applied to one of the lower corners of the specimen at an angle of 20° from the vertical, so that the tip of the inner cone touches the specimen.

The flame was applied for 5 seconds and then removed for 5 seconds. This was repeated until the specimen was subjected to the test flame five times total.

| Observations After Fifth Removal of Test Flame | | | |
|---|---|---|---|
| | 1 | 2 | 3 |
| Duration of flaming and glowing, sec. | 23 | 32 | 25 |
| Affected length, in. | 2.78" | 2.50" | 1.94" |
| Dripping | None | None | None |
| Deformation | curled slightly at exposed end | | |

EXAMPLE VI

Vertical Burning Test—UL 94

Sample 9 of Example I (#0202-6, 78 mils) Thickness was measured with a micrometer Ten specimens 4 9/16 inches × ½ inch were tested. Five specimens were tested for 5U classification, since the burner was already adjusted for this test. It was found that two out of five specimens passed the criteria. A natural gas flame was used.

| | 1 | 2 | 3 | 4 | 5 |
|---|---|---|---|---|---|
| Duration of flaming and glowing, sec. | 29 | 43 | 76 | 78 | 102 |
| Affected length, inches | 2.81 | 3.50 | 3.25 | Burnt to clump (4") | Burnt to clump (4") |
| Dripping | None | None | None | None | None |
| Deformation | Became elongated | | | | |

EXAMPLE VII

Vertical Burn Test—UL 94

Sample 9 of Example I (#0202-6, 78 mil)

Five specimens, 4 9/16 inches × one-half inch were test for 94U-0, 94U-1 or 94U-2 classification.

The specimens were held vertically 9.5 mm above the orifice of the burner. The burner was adjusted to produce a three-quarter inch (19 mm) flame. The air supply was increased until the yellow tip of the flame disappeared. The specimens were exposed to the test flame for 10 seconds. The burner was removed and any flaming was noted. When the specimens stopped burning, the burner was placed under the specimens for another 10 seconds.

| | 1 | 2 | 3 | 4 | 5 |
|---|---|---|---|---|---|
| Duration of flaming after 1st ten sec. exp. (in secs) | 55 | 40 | 70 | 26 | 19 |
| Duration of flaming after 2nd ten sec. exp. (in secs) | 25 | 0 | 0 | 3 | 40 |
| Duration of glowing after 2nd application | None | None | None | None | None |
| Dripping | None | None | None | None | None |
| Length of Affected Area - inches | ~1 | ¾ | ¾ | ~½ | 1¼ |
| Burnt to clump | No | No | No | No | No |

EXAMPLE VIII

Figure 2:
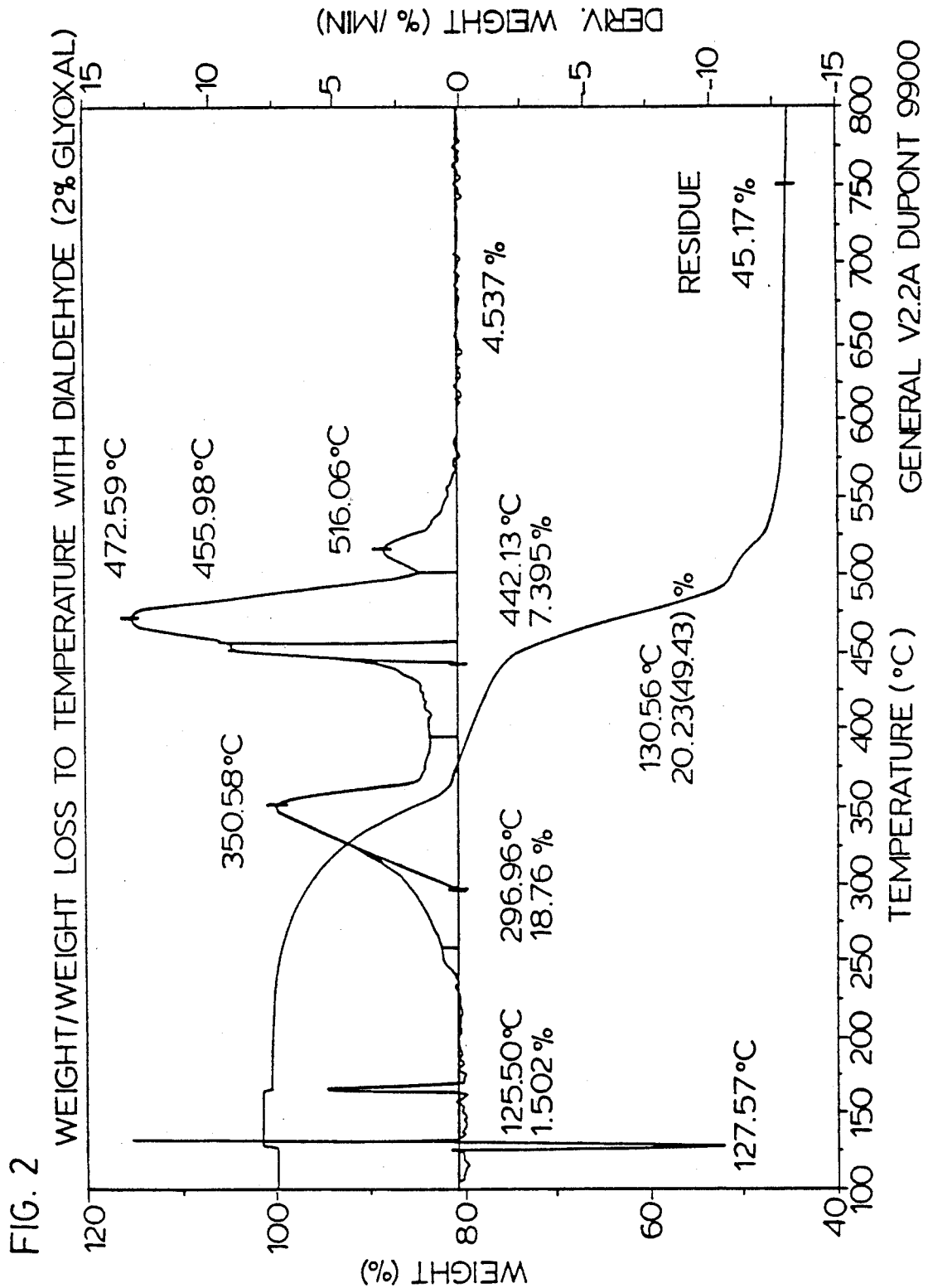

FIGS. 1 and 2 show weight and percent weight loss of two compositions during heating. The composition tested in FIG. 1 is a polyethylene composition of the invention of Sample 2 of Example 1 not containing a dialdehyde. The composition tested in Sample 9 of Example 1 with dialdehyde added.

The composition of FIG. 2 lost the bulk of its mass at a substantially higher temperature, 472.59° C. than the composition of FIG. 1, which lost the bulk of its mass at 437.22° C.

Loss of mass at substantially higher temperatures indicates better flame retardancy or resistance. The results of FIGS. 1 and 2 indicate a marked improvement in flame retardancy characteristics with addition of a dialdehyde to the compositions of the invention.

Although preferred embodiments of the invention have been describe herein in detail, it will be understood by those skilled in the art that variations may be made thereto without departing from the spirit of the invention or the scope of the appended claims.

We claim:

1. A fire retardant composition having an olefinic base material, wherein compositional components are cross-linked in a hydrophobic/hydrophilic relationship by means of a condensation-type reaction between carboxyl groups contained within said olefinic base material and hydroxyl groups contained within a frame retardant additive, with silanol groups contained in an organopolysiloxane, said composition comprising:

(a) from about 5% to about 60% by weight of olefinic copolymer or terpolymer which includes a substance containing carboxyl groups:

(b) from about 1% to about 15% by weight of an organopolysiloxane;

(c) from about 20% to about 85% by weight of a metal oxide hydrate, wherein said metal is selected from the group consisting of a metal from group I, group II or group III; and (d) from about 0.1% up to about 10% by weight of a dialdehyde.

2. A fire retardant composition of claim 1, wherein said dialdehyde is selected from the group consisting of glyoxal and glutaraldehyde.

3. A fire retardant composition of claim 2, wherein 0.1 to 4% by weight of said selected dialdehyde is in said composition.

4. A fire retardant composition of claim 3, wherein 0.5 to 3% by weight of said selected dialdehyde is in said composition.

5. A polycondensation-type method of fabricating a fire retardant insulative composition, comprising the steps of:

(a) linking carboxyl groups contained in a hydrophobic olefinic base material with silanol groups contained in a silicone material;

(b) linking silanol groups of said silicone material additionally with hydroxyl groups contained in a hydrophilic fire retardant material, whereby said silicone material is linked to both said hydrophilic and hydrophobic materials, and (c) blending a dialdehyde into said composition to enhance cross-linking.

6. A fire retardant composition formed by a polycondensation-type process, comprising:

a hydrophobic olefinic base material containing carboxyl groups;

a hydrophobic fire retardant filler material containing hydroxy groups:

a silicone material containing silanol groups linked to both said hydrophobic olefinic base material carboxyl groups and said hydrophilic fire retardant filler material hydroxyl groups; and a dialdehyde linked within the silanol and carboxyl group linkage.

7. The fire retardant composition of claim 6, further comprising a dialdehyde linked within the silanol and carboxyl group linkage.

8. The fire retardant composition of claim 6, wherein said silicone material contains a silicone resin and siloxane fluid.

9. The fire retardant composition of claim 7, wherein said silicone material contains a silicone resin and siloxane fluid.

* * * * *

UNITED STATES PATENT AND TRADEMARK OFFICE
CERTIFICATE OF CORRECTION

PATENT NO. : 5,017,637
DATED : May 21, 1991
INVENTOR(S) : Philip J. Smith and Jacques Mortimer It is certified that error appears in the above-identified patent and that said Letters Patent is hereby corrected as shown below:

Col. 4, line 59, after the word "unit", delete the balance of the sentence;

Col. 12, line 6, "Br" should be --BR--.

Col. 14, line 38, "1¼" should be --1½--.

Col. 14, line 60, "describe" should be --described--.

Colume 14, after line 58, insert "Example IX" as follows:

EXAMPLE IX
Cable Physical Test Data

| | Sample A* | Samble B** |
|---|---|---|
| Tensile Elongation | Elongation/ | Elongation/ |
| Unmodified Sample | Ultimate | Ultimate |
| | <u>Tensile Psi</u> | <u>Tensile Psi</u> |
| .030 inch wall | 80%/2100 Psi | 105%/1896 Psi |
| .008 inch wall | 90%/2200 Psi | 110%/1817 Psi |
| Tensile Elongation After $\beta$ irradiation | | |
| 0.30 inch wall | 133%/2614 Psi | 173%/2430 Psi |

UNITED STATES PATENT AND TRADEMARK OFFICE
CERTIFICATE OF CORRECTION

PATENT NO. : 5,017,637
DATED : May 21, 1991
INVENTOR(S) : Philip J. Smith and Jacques Mortimer It is certified that error appears in the above-identified patent and that said Letters Patent is hereby corrected as shown below:

Tensile Elongation After
7 Days Age Testing at
121°C 0.30 inch wall        20%/1589 Psi        20%/1532 Psi UW-1 Test .030 inch wall        Pass        Pass Insulation Resistance        10,000 Meg $\Omega$        5,000 Meg $\Omega$ Shrinkage Test .030 inch wall        None        None \* Sample A is Sample 10 of Example 1

\*\* Sample B is Sample 11 of Example 1

During the testing of the various flame retardant compositions of this invention, it is noted that the compositions fail to drip when exposed to flame. This is a significant development and is thought to be due to the degree of cross-linking in the composition. At the stage of processing, there appears to be a condensation-type polymerization taking place in the reactivity of the various components with the carboxyl groups. During exposure, however,

UNITED STATES PATENT AND TRADEMARK OFFICE
CERTIFICATE OF CORRECTION

PATENT NO. :   5,017,637

DATED       :   May 21, 1991

INVENTOR(S) :   Philip J. Smith and Jacques Mortimer

It is certified that error appears in the above-identified patent and that said Letters Patent is hereby corrected as shown below:

to a flame, it is believed that additional cross-linking occurs to form a solid charred substance which is inclined not to drip and expose fresh polymer. This is a significant development, particularly when it is considered that the compositiion is particularly useful in the formation of ceiling tile. Ceiling tiles of this invention, when exposed to a flame, are less likely to drop from the ceiling and hence contain the fire for a longer period.

Signed and Sealed this

Third Day of November, 1992

*Attest:*

DOUGLAS B. COMER

*Attesting Officer*       Acting Commissioner of Patents and Trademarks